United States Patent Office 3,549,395
Patented Dec. 22, 1970

3,549,395
ORGANOSILICONATES IN LITHIUM POLYSILICATES
George W. Sears, Wilmington, Del., and Dennis R. Smith, New London, Pa., assignors to E. I. du Pont de Nemours and Company, Wilmington, Del., a corporation of Delaware
No Drawing. Filed Feb. 28, 1968, Ser. No. 708,778
Int. Cl. C09d 1/04
U.S. Cl. 106—84
8 Claims

ABSTRACT OF THE DISCLOSURE

Incorporation of organosiliconates such as sodium methyl siliconate in aqueous lithium polysilicate solutions, in an amount ranging from 0.0045 to 0.20 calculated as moles of silicon added as organosilicate per mole of silicon present as lithium polysilicate, results in greatly improved physical properties of the lithium polysilicate when used as an inorganic binder vehicle.

BACKGROUND OF THE INVENTION

This invention relates to inorganic binder vehicles and more particularly is directed to aqueous lithium polysilicate solutions containing an organosiliconate such as sodium methyl siliconate and to their use as inorganic binder vehicles.

Lithium polysilicate is known to be a suitable binder vehicle for such materials as metallic zinc. Organosiliconates such as sodium methyl siliconate are known to be water-repellent chemicals useful in imparting silicone properties.

We have discovered that by incorporating measured amounts of organosiliconates into aqueous lithium polysilicate solutions a surprising improvement in the physical properties of the coatings bonded with lithium polysilicate is achieved. More particularly, by incorporating the amounts set out below of organosiliconates into aqueous lithium polysilicate solutions, we obtain an inorganic binder vehicle which demonstrates improved initial cure, faster full cure, and an extended pot life as compared to aqueous lithium polysilicates not containing the organosiliconate.

SUMMARY OF THE INVENTION

In summary this invention is directed to inorganic binder vehicles consisting essentially of water, lithium polysilicate having a mole ratio of $SiO_2:Li_2O$ of from 4:1 to 25:1, and an organosiliconate of the formula (1)
$$R-\underset{\underset{Z}{\overset{\overset{X}{O}}{|}}}{\overset{|}{Si}}-OY$$

wherein:

R is a hydrocarbon group of 1 through 8 carbon atoms;
X is hydrogen or the cation of a strong base;
Y is hydrogen or the cation of a strong base; and
Z is hydrogen or the cation of a strong base;

the organosiliconate being present in an amount ranging from 0.0045 to 0.20 calculated as moles of silicon added as organosiliconate per mole of silicon added as lithium polysilicate.

These binder vehicles demonstrate surprisingly improved initial cure, faster full cure, and extended pot life as compared to similar binder vehicles not containing the organosiliconate.

These vehicles are useful as binders for particulate and pigmentary materials such as powdered metals, pigmentary titania, colloidal graphite platelets, aluminum pigment, potassium titanate fibers and refractory materials such as Fiberfrax, to be used in coating substrates such as glass, metal and wood.

DESCRIPTION OF THE INVENTION

Components

The organosiliconates suitable for use in this invention are those of the formula $$R-\underset{\underset{Z}{\overset{\overset{X}{O}}{|}}}{\overset{|}{Si}}-OY$$

wherein:

R is a hydrocarbon group of 1 through 8 carbon atoms such as alkyl, alkenyl, alkynyl, aryl, aralkyl, alkaryl and cycloalkyl groups;

X is hydrogen or the cation of a strong base such as lithium, sodium, potassium, guanidinium, and tetramethylammonium;

Y is hydrogen or the cation of a strong base such as those mentioned above; and

Z is hydrogen or the cation of a strong base such as those mentioned above.

These organosiliconates can be prepared by methods known to the art, such as those disclosed in U.S. Pats. No. 2,786,042 and No. 2,886,460, or they can be obtained commercially.

Those organosiliconates of Formula 1 wherein R is methyl, and X, Y and Z are sodium, lithium or hydrogen, are preferred for reasons of economy and performance. Those preferred compounds in which two of X, Y and Z are hydrogen and the third is sodium or lithium, are most preferred because of their outstanding effectiveness in the compositions of this invention.

The lithium polysilicate solutions suitable for use in this invention are those in wihch the $SiO_2:Li_2O$ mol ratio is between 4:1 and 25:1, and the silica content is between 15 and 35% by weight based on the total weight of water and lithium polysilicate. These solutions are those described as lithium silicates in copending application Ser. No. 445,257 filed Apr. 2, 1965, now U.S. Pat. No. 3,455,709, and as lithium stabilized colloidal silica aquasols in U.S. Pat. No. 2,668,149. While the terminology used to name the compositions differs in each of these two references the compositions are identical with each other and with the lithium polysilicates of this invention.

It should be noted that the particular advantages attendant to the compositions of this invention can still be achieved even though appreciable quantities of other materials are present. Therefore, while the invention is described in terms of using an aqueous lithium polysilicate it will be understood by those skilled in the art that the advantages of this invention will be observed when there is used a mixed lithium-sodium polysilicate, to the extent that the lithium polysilicate is present.

The lithium polysilicates of this invention can be prepared by the methods disclosed in the above mentioned application Ser. No. 445,257 and U.S. Pat. No. 2,668,149.

A preferred aqueous lithium polysilicate is one in which the mole ratio of $SiO_2:Li_2O$ is between 4.5:1 and 5.5:1 and which contains between 15 and 25% $SiO_2$.

There will ordinarily be present in the compositions of this invention a particulate or pigmentary filler. Representative of suitable fillers are zinc powder, Fiberfrax aluminosilicate fibers, glass fibers, fibrous potassium titanate, attapulgite, titania pigment, aluminum pigment, graphite, mica, stainless steel flakes, Kaolin, montmorillonite, and particulate "Teflon®."

A preferred particulate filler is zinc metal powder predominantly less than 15 microns in average particle size.

Other additives will be used in the compositions of this invention for that purpose, and to impart, the advantages known to be associated with the use of such additives. For example, coloring pigments such as iron oxide, carbon black, and china clay; extenders such as red lead, lead dioxide, zinc oxide, iron oxide, and aluminum oxide; flexibilizers and viscosity agents such as bentonite and other clays; pot-life extenders such as potassium, lithium, or sodium dichromate; curing agents such as sodium, lithium, or ammonium bicarbonate; and agents to enhance dry coat properties such as sodium, lithium, amonium, or potassium borate, can all be used to advantage.

Preparation

The compositions of this invention are most conveniently prepared by adding the organosiliconate to an aqueous lithium polysilicate, and then adding to this mixture whatever other additives are to be used. Such an order of addition is not critical but it is preferred to mix the organosiliconate with the aqueous lithium polysilicate before the addition of large amounts of filler materials.

As mentioned above, the organosiliconate is used in an amount ranging from 0.0045 to 0.20 calculated as moles of silicon added as organosiliconate per mole of silicon added as lithium polysilicate. As will be understood by one skilled in the art, more, or less organosiliconate can be used while still achieving the advantages of this invention. However, use of less than the 0.0045 mole described above tends to result in inconsistent performance, and use of more than the 0.20 mole as described above seems to impart little or no additional benefit and increases the cost.

Amounts of organosiliconate of from about 0.005 to about 0.05 calculated as moles of silicon added as organosiliconate per mole of silicon added as lithium polysilicate, are preferred for reasons of greatest consistency and economy.

The amounts of additive used will vary considerably depending on the purpose for which the additive is included. Thus, ingredients such as pot-life extenders and curing agents will be used in amounts as small as 0.005 percent based on the total weight of aqueous lithium polysilicate and organosiliconate, and in amounts of up to several percent; while fillers such as zinc powder, graphite or other particulate or pigmentary fillers will be used in amounts ranging from 0.05 parts perpart of aqueous lithium polysilicate plus organosiliconate to 5 or more parts perpart of aqueous lithium polysilicate plus organosilicate. The zinc metal powder is ordinarily used in much greater amounts than other pigmentary or particulate fillers. The amounts of zinc powder used will ordinarily range from 0.5 to 5 parts by weight per part by weight of polysilicate plus organosilicate. The amounts of other fillers will usually range from about 0.05 to 0.5 part by weight perpart of polysilicate plus organosilicate.

Utility

The uses to which the compositions of this invention can be put are many and varied. Generally speaking the compositions of this invention find utility as binder vehicles for a great variety of fillers to be applied over a wide range of substrate materials.

It will be noted that regardless of the filler material and independent of the substrate to be coated, the addition of the organosiliconates of this invention to aqueous lithium polysilicates in the manner and amounts set forth herein results in much faster initial cure of a subsequent coating than as compared to the same composition lacking only the organosiliconate. Similarly the full or complete cure of the coatings of compositions of this invention is achieved much sooner than with similar compositions lacking the organosiliconate. Conversely, however, the potlife of compositions of this invention is ordinarily much longer than for similar compoistions not containing an organosiliconate of this invention.

While we do not fully understand the mechanism by which these unusual properties are achieved, it is clear that some interaction of the components provides these results. The following tests have been devised to give a simple but reproducible measure of initial cure, full cure and pot life of coatings filled with metallic zinc powder.

Initial cure is measured by a water-jet test comprising the following steps:

(1) Sandblasted, degreased, mild steel panels measuring 4¼ inches square are uniformly sprayed to a thickness of 3 to 5 mils with the coating composition to be tested.
(2) The coated panels are air dried at room temperature and 50% relative humidity.
(3) At regular timed intervals a test panel is placed in a rack which holds the panel at a 45° angle to a falling stream of water. The water flows through a 4 millimeter orifice located one inch above the panel and connected to a constant 3 foot head of water directly above the orifice.
(4) The coated panels are subjected to the water-jet for ten minutes, are then air-dried at room temperature and are then examined for defects in the coating.
(5) If the coating shows any evidence of lifting, blistering or washing off the panel, the coating is classed as a failure and is termed not initially cured. Conversely if the coating is unaffected by the water-jet it is termed initially cured.

Full cure is measured by a wet abrasion test carried out in the following manner:

(1) Sandblasted, degreased, mild steel panels measuring 4¼ inches square are uniformly sprayed to a thicknes sof 3 to 5 mils with the coating composition to be tested.
(2) The coated panels are air dried at room temperature and 50% relative humidity.
(3) At regular hourly intervals test panels are submerged to a depth of 3⅜ inches in 75° F. tap water for one hour. The water in the bath is slightly agitated.
(4) The test panels are removed from the water bath after the one hour treatment and are air dried at room temperature for two hours.
(5) The dried panels are weighed and then abraded for 100 cycles with a Tabor Abrasor fitted with CS–17 Calibrase Wheels and 1000 gram weights. The panels are then reweighed to determine how much coating was removed during abrasion.
(6) The milligrams of coating removed is an index of hardness and water insensitivity, criteria indicating full cure. A coating is considered fully cured when less than 50 milligrams of coating is removed by Step 5, or when no further weight loss is observed on further aging.

Pot-life is the amount of time that a coating composition remains stable and can be sprayed after completing formulation. Pot-life is measured by determining the viscosity of a formulation with a #3 Zahn Cup at 25° C. A formulation is considered unstable and unsprayable, and thus pot-life is considered ended, when the viscosity becomes greater than 20 Zahn seconds.

This invention is further illustrated in the following examples wherein parts and percentages are by weight unless otherwise specified.

EXAMPLE 1

To a suitable container is added 99 parts of an aqueous lithium silicate solution having a mole ratio of $SiO_2:Li_2O$ of 4.8:1, and containing 20% $SiO_2$, along with 0.05 part of potassium dichromate, and 0.1 part of "Carbopol 941" carboxy vinyl acid polymer sold by B. F. Goodrich. These components are mixed with high shear, and to the resulting mixture is aded 1.0 part of sodium methyl siliconate solution containing 9.5% $Na_2O$ and 20% $CH_3SiO_{1.5}$, and 292 parts of 6–9 micron zinc dust with stirring. Three of five mil films of the composition are sprayed on sandblasted, degreased, mild steel panels. The initial cure of these panels, measured by the water-jet test is achieved in 30 minutes, one-half the time required for a similar formulation not containing sodium methyl siliconate. Further, the time required to fully cure the coatings as measured by the wet abrasion test is shortened to 14 hours, 12% of that required by similar coatings not containing sodium methyl siliconate. Likewise, pot-life is 7 days, extended by 30% over the same formulation without sodium methyl siliconate.

EXAMPLE 2

To a suitable container is added 99.5 parts of an aqueous lithium silicate solution having a mole ratio of $SiO_2:Li_2O$ of 4.8:1, and containing 20% $SiO_2$, along with 0.05 part of potassium dichromate, and 0.1 part of "Carbopol 941." These are mixed with high shear, and to the resulting mixture is added 0.5 part of sodium methyl siliconate solution containing 9.5% $Na_2O$ and 20% $CH_3SiO_{1.5}$, and 292 parts of 6–9 micron zinc dust with stirring. Three to five mil films are prepared on sandblasted, degreased, mild steel panels. The initial cure of these panels is achieved in 45 minutes, three-fourths the time required for a similar formulation not containing sodium methylsiliconate. Further, the time required to fully cure the coating is reduced to 24 hours, 20% of that required by similar coatings not containing sodium methyl siliconate. The pot-life is 6 days, increased by 15% over similar formulations without sodium methyl siliconate.

EXAMPLE 3

To a suitable container is added 95 parts of an aqueous lithium silicate solution having a mole ratio of $SiO_2:Li_2O$ of 4.8:1 and containing 20% $SiO_2$, along with 0.05 part of potassium dichromate, and 0.1 part of "Carbopol 941." These are mixed with high shear, and to the resulting mixture is added 5.0 parts of sodium methyl siliconate solution containing 9.5% $Na_2O$ and 20% $CH_3SiO_{1.5}$, and 292 parts of finely divided zinc dust with stirring. Three to five mil films are sprayed on sandblasted, degreased, mild steel panels. The initial cure of these coatings is achieved in 15 minutes, one-fourth the time required for a similar formulation not containing sodium methyl siliconate. Further, the time required to fully cure the coatings is reduced to 12 hours, only 10% of that required by similar coatings not containing sodium methyl siliconate. Likewise, the pot-life is 7 days, extended by 30% over the same formulation without sodium methyl siliconate.

EXAMPLE 4

To a suitable container is added 85 parts of an aqueous lithium silicate solution having a mole ratio of $SiO_2:Li_2O$ of 4.8:1 and containing 20% $SiO_2$ along with 0.05 part of potassium dichromate, and 0.1 part of "Carbopol 941." These are mixed with high shear, and to the resulting mixture is added 15.0 parts sodium methyl siliconate solution containing 9.5% $Na_2O$ and 20% $CH_3SiO_{1.5}$, and 292 parts of zinc dust with stirring. Three to five mil films are sprayed on sandblasted, degreased, mild steel panels. The initial cure of these panels is achieved in 15 minutes, one-fourth the time required for similar formulations not containing sodium methyl siliconate. Likewise, the time required to fully cure the coatings is reduced to 18 hours, only 15% of that required by similar coatings not containing sodium methyl siliconate. Furthermore, pot-life is 7 days, increased 30% over the similar formulations without sodium methyl siliconate.

EXAMPLE 5

To a suitable container is added 99 parts of an aqueous lithium silicate solution having a mole ratio of $SiO_2:Li_2O$ of 8.5:1 and containing 20% $SiO_2$, along with 0.05 part of potassium dichromate, and 0.5 part "Benaqua" modified montmorillonite clay sold by National Lead which are mixed with high shear. To the resulting mixture is added with stirring 1.0 part of sodium methyl siliconate solution containing 9.5% $Na_2O$ and 20% $CH_3SiO_{1.5}$, and 282 parts of zinc dust. Three to five mil films are prepared on sandblasted, degreased, mild steel panels. The initial cure of these panels is achieved in 20 minutes, two-thirds the time required for a similar formulation not having sodium methyl siliconate. Likewise, the time required to fully cure the coatings is shortened to 12 hours, only 25% of that required by similar coatings not containing sodium methyl siliconate. Further, pot-life is 10 days, extended 30% over similar formulations without sodium methyl siliconate.

EXAMPLE 6

To a suitable container is added 99 parts of an aqueous lithium silicate solution having a mole ratio of $SiO_2:Li_2O$ of 4.8:1 and containing 20% $SiO_2$, along with 0.05 part of potassium dichromate, and 0.1 part of "Carbopol 941," which are mixed with high shear. To the resulting mixture is added with stirring 1.0 part of lithium methyl siliconate solution containing 4.6% $Li_2O$ and 20% $CH_3SiO_{1.5}$, and 292 parts of 6–9 micron zinc dust. Three to five mil films are sprayed on sandblasted, degreased, mild steel panels. The initial cure of these coatings is achieved in 30 minutes, one-half the time required for a similar formulation not containing lithium methyl siliconate. Further, the time required to fully cure the coatings is reduced to 14 hours, only 12% of that required by similar coatings not containing lithium methyl siloconate. Likewise, pot-life is 7 days, extended by 30% over the same formulation without lithium methyl siliconate.

EXAMPLE 7

To a container of 0.1 N $H_2SO_4$ is added dropwise 5 parts of pure methyl trichlorosilane which hydrolyses to form methyl siliconic acid. The methyl siliconic acid polymerizes to form an amorphous insoluble solid on the surface of the 0.1 N $H_2SO_4$ solution. The polymerized methyl siliconic acid is removed from the dilute acid and dissolved in 67 parts of 2 N tetramethyl ammonium hydroxide to form a tetramethyl ammonium methyl siliconate solution.

To a suitable container is added 99 parts of an aqueous lithium silicate solution having a mole ratio of $SiO_2:Li_2O$ of 4.8:1 and containing 20% $SiO_2$, along with 0.05 part of potassium dichromate, and 0.1 part of "Carbopol 941," which is mixed with high shear. To the resulting mixture is added 1.0 part of tetramethyl ammonium methyl siliconate solution prepared above and 292 parts zinc dust with stirring. Three to five mil films are prepared on sandblasted, degreased, mild steel panels. The initial cure of these panels is achieved in 30 minutes, one-half the time required for a similar coating not containing tetramethyl ammonium methyl siliconate. Furthermore, the time required to fully cure the coating is decreased to 14 hours, only 12% of that required by similar formulations not containing tetramethyl ammonium methyl siliconate. Likewise, pot-life is 7 days, extended by 30% over the same formulation without tetramethyl ammonium methyl siliconate.

EXAMPLE 8

To a suitable container is added 99.5 parts of an aqueous lithium silicate solution having a mole ratio of $SiO_2:Li_2O$ of 4.8:1 and containing 20% $SiO_2$, along with 0.05 part of potassium dichromate, 0.1 part of "Carbopol 941," and 0.5 part of methyltrichlorosilane which are mixed with high shear. The methyl trichlorosilane hydrolyzes in the strongly alkaline lithium polysilicate to give a lithium methyl siliconate and forming 3 moles of chloride ion per mole of siliconate. To the resulting mixture is added 292 parts zinc dust with stirring. Three to five mil films of the composition are sprayed on sandblasted, degreased, mild steel panels. The initial cure of these coatings is achieved in 30 minutes, one-half the time required for similar formulations not containing methyltrichlorosilane. Likewise, the time required to fully cure the coatings is 48 hours, reduced to 40% of that required by similar coatings not containing methyltrichlorosilane. However, the pot-life is 2 days, decreased 60% over that of similar formulations without methyltrichlorosilane, due probably to the chloride ion derived from the chlorosilane.

EXAMPLE 9

To a suitable container is added 108 parts of a lithium silicate solution having a mole ratio $SiO_2:Li_2O$ of 4.8:1 and containing 20% $SiO_2$ and 12 parts of sodium methylsiliconate containing 9.5% $Na_2O$ and 20% $CH_3SiO_{1.5}$, which are mixed together with moderate agitation. To the resulting mixture is added 80 parts of "Aquadag" colloidal graphite sold by the Acheson Colloids Company, which is mixed with high shear. This composition is drawn out into a 2 mil film on brushed mild steel panels, previously cleaned by washing with hot soapy water, rinsing with distilled water, spraying with acetone, and air-drying. This composition air-dries to produce a hard, black, glossy coating that is hydrophobic and resistant to concentrated ammonium hydroxide.

EXAMPLE 10

To a suitable container is added 135 parts of a lithium silicate solution having a mole ratio $SiO_2:Li_2O$ of 4.8:1 and containing 20% $SiO_2$ and 15 parts of sodium methyl siliconate containing 9.5% $Na_2O$ and 20% $CH_3SiO_{1.5}$, which are mixed with moderate agitation. To the resulting mixture are added 20 parts of PKT, Du Pont pigmentary potassium titanate and 40 parts of water which are mixed with high shear. This composition is drawn out into 2 mil films on previously cleaned, brushed mild steel Q panels and air-dried at room temperature. The dry film is a hard, white, glossy coating that is hydrophobic and resistant to concentrated ammonium hydroxide.

EXAMPLE 11

To a suitable container is added 112.5 parts of a lithium silicate solution having a mole ratio $SiO_2:Li_2O$ of 4.8:1 and containing 20% $SiO_2$, and 12.5 parts of sodium methyl siliconate containing 9.5% $Na_2O$ and 20% $CH_3SiO_{1.5}$, which ase mixed with moderate agitation. To the resulting mixture is added 25 parts of 400 mesh polished aluminum powder, MD–7300 sold by the Metal Disintegrating Company, which is mixed with high shear. This composition is drawn out into a 2 mil film on previously cleaned, brushed mild steel Q panels and air-dried at room temperature. The dry film is a hard, glossy, metallic coating that is hydrophobic, resistant to ammonium hydroxide, and resistant to 6 N HCl.

We claim:
1. An inorganic coating composition consisting essentially of (a) one part by weight of a vehicle comprising aqueous lithium polysilicate having a mole ratio of $SiO_2:Li_2O$ of from 4:1 to 25:1 and containing from 15 to 34 percent by weight of $SiO_2$ and an organosiliconate of the formula:

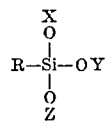

wherein:
R is a hydrocarbon group of 1 through 8 carbon atoms;
X is a hydrogen or the cation of a strong base;
Y is a hydrogen or the cation of a strong base; and
Z is hydrogen or the cation of a strong base;
the organosiliconate being present in an amount ranging from 0.0045 to 0.20 calculated as moles of silicon added as organosiliconate per mole of silicon added as lithium polysilicate; and (b) from 0.5 to 5 parts by weight of zinc metal powder predominantly less than 15 microns in average particle size.

2. An inorganic coating composition of claim 1 in which the aqueous lithium polysilicate has a mole ratio of $SiO_2:Li_2O$ of from 4.5:1 to 5.5:1 and contains from 15 to 25 percent by weight $SiO_2$.

3. An inorganic coating composition of claim 2 in which the organosiliconate is selected from the group consisting of monosodium and monolithium methyl siliconate.

4. An inorganic coating composition of claim 3 in which the organosiliconate is present in an amount ranging from 0.005 to 0.05 moles of silicon added as organosiliconate per mole of silicon added as lithium polysilicate.

5. A method of improving the cure rate of an inorganic coating composition consisting essentially of (a) water, (b) lithium polysilicate having an $SiO_2:Li_2O$ mole ratio of from 4:1 to 25:1 and containing from 15 to 35 percent by weight of $SiO_2$, and (c) zinc metal powder predominantly less than 15 microns in average particle size, comprising adding to the composition an organosiliconate of the formula

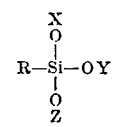

wherein:
R is a hydrocarbon group of 1 through 8 carbon atoms;
X is hydrogen or the cation of a strong base;
Y is hydrogen or the cation of a strong base; and
Z is hydrogen or the cation of a strong base;
said organosiliconate being added in an amount ranging from 0.0045 to 0.20 calculated as moles of silicon of organosiliconate per mole of silicon present as lithium polysilicate.

6. A method of claim 5 in which the lithium polysilicate has a mole ratio of $SiO_2:Li_2O$ of from 4.5:1 to 5.5:1 and the coating composition contains from 15 to 25 percent by weight of $SiO_2$.

7. A method of claim 6 in which the organosiliconate is selected from the group consisting of monosodium methyl siliconate and monolithium methyl siliconate.

8. A method of claim 7 in which the organosiliconate is used in an amount ranging from 0.005 to 0.05 calculated as moles of silicon added as organosiliconate per mole of silicon present as lithium polysilicate.

References Cited

UNITED STATES PATENTS

| | | | |
|---|---|---|---|
| 2,905,562 | 9/1959 | Brown | 106—74 |
| 3,442,665 | 5/1969 | Muller et al. | 106—84 |
| 3,455,709 | 7/1969 | Sears | 106—84 |

JAMES E. POER, Primary Examiner